United States Patent
Prohaska

(10) Patent No.: US 7,284,764 B2
(45) Date of Patent: Oct. 23, 2007

(54) SPRAYER STRUT SUSPENSION

(75) Inventor: James B. Prohaska, Prior Lake, MN (US)

(73) Assignee: Miller-St. Nazianz, Inc., St. Nazianz, WI (US)

( * ) Notice: Subject to any disclaimer, the term of this patent is extended or adjusted under 35 U.S.C. 154(b) by 360 days.

(21) Appl. No.: 11/067,233

(22) Filed: Feb. 25, 2005

(65) Prior Publication Data

US 2006/0027987 A1 Feb. 9, 2006

Related U.S. Application Data

(60) Provisional application No. 60/598,628, filed on Aug. 4, 2004.

(51) Int. Cl.
*B60G 3/01* (2006.01)

(52) U.S. Cl. .................. 280/124.127; 280/93.512; 280/124.157

(58) Field of Classification Search ......... 280/124.133, 280/124.134, 124.157, 93.511, 93.512, 124.125, 280/124.145, 124.127; 180/209, 900, 21, 180/213, 253

See application file for complete search history.

(56) References Cited

U.S. PATENT DOCUMENTS

| | | | | | |
|---|---|---|---|---|---|
| 1,302,489 | A | * | 4/1919 | Hollis | .................. 280/638 |
| 2,508,057 | A | * | 5/1950 | Bishop | .................. 244/50 |
| 2,749,137 | A | * | 6/1956 | Thomsen et al. | .......... 280/43.2 |
| 2,750,199 | A | * | 6/1956 | Hart | .................. 280/638 |
| 2,818,930 | A | * | 1/1958 | Kucera | .................. 180/210 |
| 2,934,157 | A | * | 4/1960 | Harp | .................. 180/24.08 |
| 3,044,762 | A | * | 7/1962 | Stengelin | .............. 267/64.23 |
| 3,341,220 | A | * | 9/1967 | Kress | .................. 296/35.1 |
| 3,565,455 | A | * | 2/1971 | Kostas | .............. 280/124.127 |
| 3,741,581 | A | * | 6/1973 | Patrin | .................. 280/86.758 |
| 4,159,749 | A | * | 7/1979 | Boushek, Jr. | .............. 180/308 |
| 5,039,129 | A | * | 8/1991 | Balmer | .................. 180/308 |
| 5,174,415 | A | * | 12/1992 | Neagle et al. | .............. 187/234 |
| 5,597,172 | A | * | 1/1997 | Maiwald et al. | ...... 280/124.153 |
| 5,628,377 | A | * | 5/1997 | Le Gloan | .................. 180/21 |
| 6,371,237 | B1 | * | 4/2002 | Schaffer | .................. 180/253 |
| 6,406,043 | B1 | * | 6/2002 | Balmer | .................. 280/124.1 |
| 6,435,766 | B1 | * | 8/2002 | Titford | .................. 404/75 |
| 6,443,687 | B1 | * | 9/2002 | Kaiser | .................. 414/685 |
| 6,454,294 | B1 | * | 9/2002 | Bittner et al. | .................. 280/677 |
| 6,460,643 | B1 | * | 10/2002 | Degelman | .............. 180/89.12 |
| 6,491,306 | B2 | * | 12/2002 | Schaffer | .............. 280/5.502 |
| 6,997,467 | B2 | * | 2/2006 | Dean | .................. 280/93.512 |
| 7,140,625 | B2 | * | 11/2006 | Dean | .................. 280/124.146 |
| 7,168,717 | B2 | * | 1/2007 | Wubben et al. | ....... 280/124.127 |
| 2002/0053795 | A1 | * | 5/2002 | Schaffer | .................. 280/830 |
| 2006/0170176 | A1 | * | 8/2006 | Wubben et al. | ....... 280/124.127 |

* cited by examiner

*Primary Examiner*—Eric Culbreth
*Assistant Examiner*—Barry Gooden, Jr.
(74) *Attorney, Agent, or Firm*—Whyte Hirschboeck Dudek SC

(57) ABSTRACT

A chassis suspension for agricultural equipment, the chassis suspension comprising: an axle having a substantially upright journal adapted for upright axial constraint of an inner journal therein; an inner journal extending into the upright journal, the inner journal having a lower end, wherein the inner journal is adapted to constrain axial movement of a strut rod therein; a strut rod extending into the inner journal and having a lower strut rod portion adapted for mounting a ground-engaging drive mechanism and wheel, wherein the lower strut rod portion has an upper end; and, a spring constrained between the lower end of the inner journal and the upper end of the lower strut rod portion.

2 Claims, 2 Drawing Sheets

SPRAYER STRUT SUSPENSION

CROSS-REFERENCE TO RELATED APPLICATIONS

This application claims the benefit of U.S. provisional application Ser. No. 60/598,628 filed on Aug. 4, 2004, pending.

BACKGROUND OF THE INVENTION

This invention relates generally to chassis suspension for agricultural equipment, and more specifically to methods and apparatus for a spring-cushioned suspension system for a sprayer.

BRIEF SUMMARY OF THE INVENTION

A chassis suspension comprising: an axle having a substantially upright journal adapted for upright axial constraint of an inner journal therein; an inner journal extending into the upright journal, the inner journal having a lower end, wherein the inner journal is adapted to constrain axial movement of a strut rod therein; a strut rod extending into the inner journal and having a lower strut rod portion adapted for mounting a ground-engaging drive mechanism and wheel, wherein the lower strut rod portion has an upper end; and, a spring constrained between the lower end of the inner journal and the upper end of the lower strut rod portion.

DETAILED DESCRIPTION OF THE INVENTION

Figure 1:
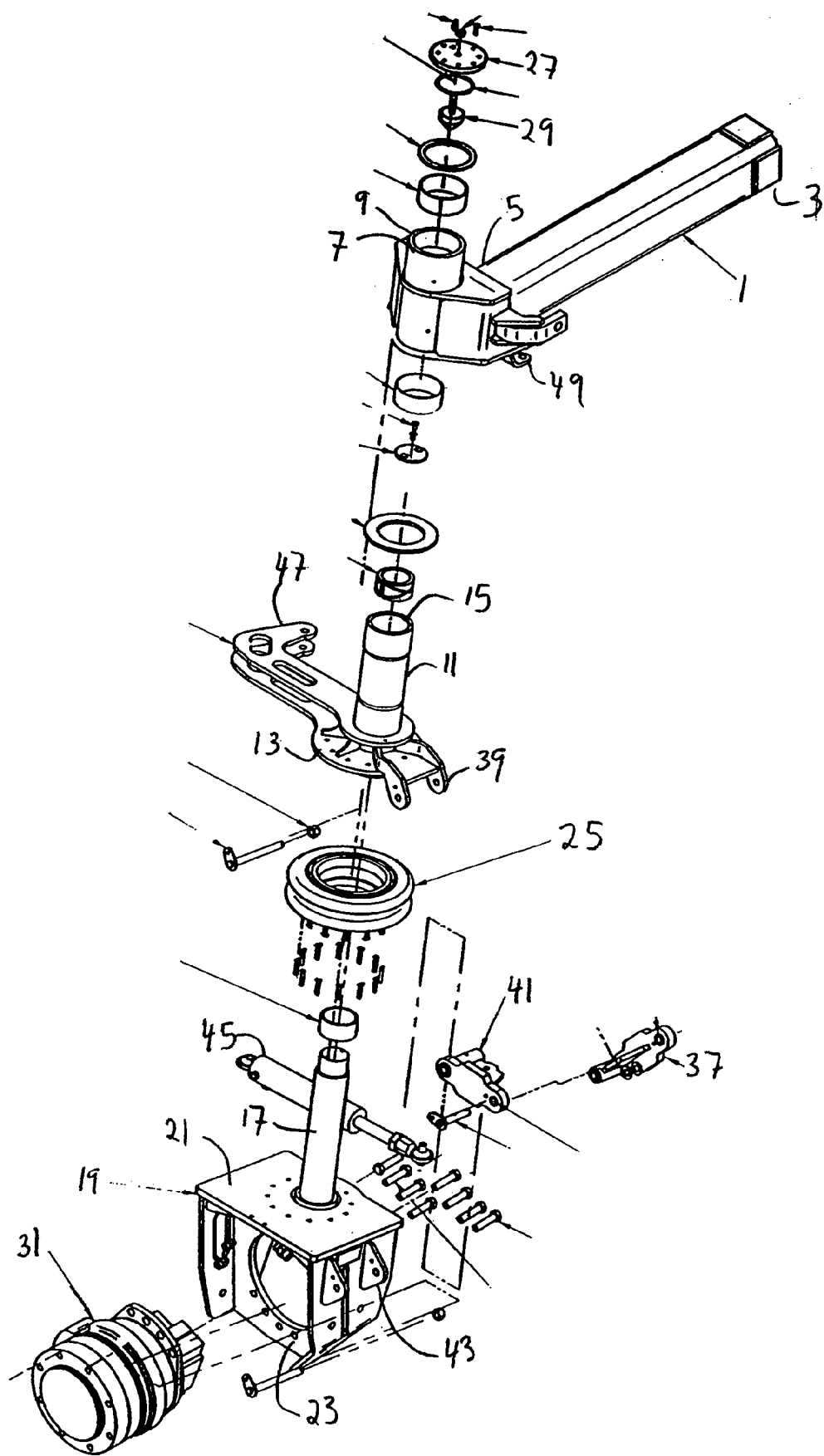
FIG. 1 shows an expanded view of a suspension strut assembly of the current invention.
Figure 2:
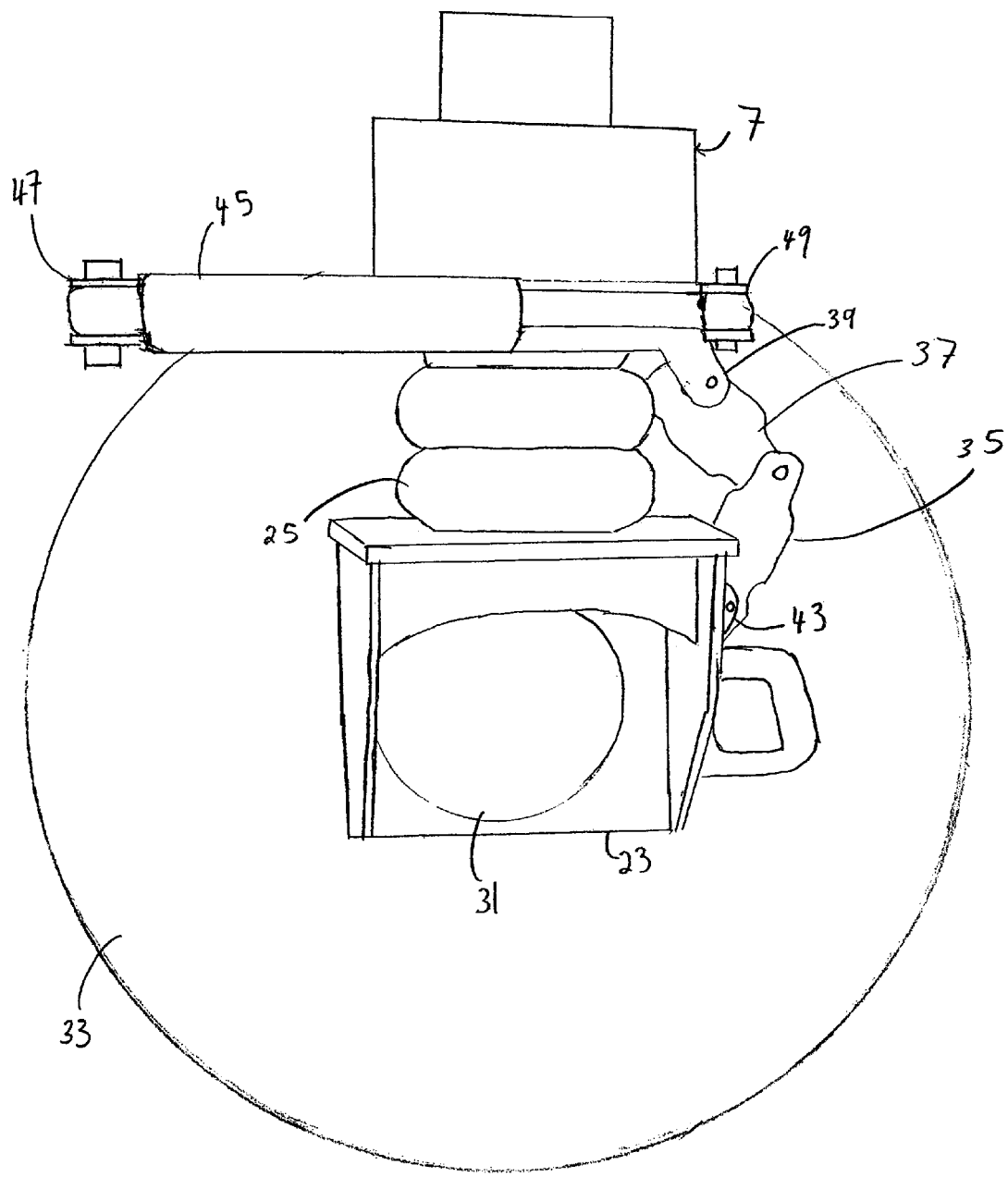
FIG. 2 shows a side view of the assembled strut assembly of FIG. 1 in position on a wheel of a sprayer.

A preferred embodiment of a typical strut assembly of the invention is shown in FIGS. 1 and 2. Axle 1 attaches to the chassis or frame of the sprayer (not shown). In a typical installation, the proximate end 3 of axle 1 slides into the sprayer frame. The distal end 5 of axle 1 connects to a substantially upright journal 7. A circular opening 9 extends lengthwise through upright journal 7. An inner journal 11 fits through the circular opening 9 of upright journal 7 and rotatably engages upright journal 7 to allow for rotational steering motion. Upright journal 7 is adapted to constrain axial movement of inner journal 11.

Inner journal 11 has a base plate 13 located at the bottom of the journal. An opening 15 in base plate 13 extends lengthwise through inner journal 11. A strut 17 passes through opening 15 such that the strut 17 can both slide axially and rotate within opening 15.

Strut 17 is affixed to a mounting assembly 19. Mounting assembly 19 comprises a horizontal mounting plate 21 and a vertical mounting plate 23. A spring 25 is attached to both base plate 13 and horizontal mounting plate 21 such that strut 17 passes through spring 25 and into opening 15.

Preferably, spring 25 is an airbag comprising a flexible membrane that typically has a pillow or bellows shape. Pressure air in the airbag provides a spring-like dampening effect (also known as "shock absorption") to vertical movement of mounting assembly 19 relative to upright journal 7. The degree of shock absorption can be adjusted as desired by changing the air pressure in the airbag. When spring 25 is an air bag, inner journal 11 has an airtight cap 27 covering opening 15 to prevent escape of the pressurized air within the airbag. The air pressure trapped in the bore of the inner journal 11 by airtight cap 27 exerts a downward force on strut 17, thereby incorporating the cross-section of the strut rod within the effective diameter of the airbag spring 25. A bumper 29 is attached to the bottom of airtight cap 27 to prevent the top of strut 17 from striking cap 27.

A drive motor 31 is attached to vertical mounting plate 23 of mounting assembly 19. The drive motor 31 engages with a wheel 33 to provide forward and rearward motion to the sprayer. Typically, drive motor 31 is a hydraulic wheel motor such as is well-known in the art. The hydraulic wheel motors are connected to a conventional source of pressurized hydraulic fluid (not shown) on the sprayer.

The relative rotational positioning of the inner journal 11 and the mounting assembly 19 is fixed by means of a scissors joint 35. Scissors joint 35 comprises an upper arm 37 pivotally attached to a lower arm 41. Upper arm 37 is pivotally attached to a mounting bracket 39 on inner journal 11. Lower arm 41 is pivotally attached to a mounting bracket 43 on the mounting assembly 23. The scissors joint 35 permits vertical movement, but prevents rotational movement, of the inner journal 11 with respect to the mounting assembly 23.

Steering means may also be attached to the strut assemblies. A hydraulic piston 45 is connected to a conventional source of pressurized hydraulic fluid. One end of piston 45 is attached to a mounting bracket 47 on inner journal 11 while the other end of piston 45 is attached to a mounting bracket 49 located on outer journal 7. Extension or retraction of piston 45 changes the relative rotational positioning of the outer journal 7 and the inner journal 11 (and, by attachment, mounting assembly 23 and wheel 33). The steering mechanisms need not be attached to all wheel struts and is typically attached to just the front two wheel struts.

What is claimed is:

1. A chassis suspension comprising:
   an axle having a substantially upright journal adapted for upright axial constraint of an inner journal therein;
   an inner journal extending into the upright journal, the inner journal having a lower end, wherein the inner journal is adapted to constrain axial movement of a strut rod therein;
   a strut rod extending into the inner journal and having a lower strut rod portion adapted for mounting a ground-engaging drive mechanism and wheel, wherein the lower strut rod portion has an upper end; and,
   a spring constrained between the lower end of the inner journal and the upper end of the lower strut rod portion.

2. The suspension of claim 1, wherein the upright journal is further adapted for rotational movement of the inner journal therein.

* * * * *